(12) United States Patent
Wu et al.

(10) Patent No.: US 8,496,263 B2
(45) Date of Patent: Jul. 30, 2013

(54) FOLDABLE STROLLER FRAME WITH AN AUTO-EXTENDING WHEEL DISTANCE ADJUSTMENT

(75) Inventors: Tse-Chien Wu, Kaohsiung (TW); Wei-Yeh Li, Tainan (TW)

(73) Assignee: Lerado (Zhong Shan) Industrial Co., Ltd., Zhong Shan, Guang Dong Province (CN)

( * ) Notice: Subject to any disclaimer, the term of this patent is extended or adjusted under 35 U.S.C. 154(b) by 225 days.

(21) Appl. No.: 13/227,038

(22) Filed: Sep. 7, 2011

(65) Prior Publication Data
US 2012/0056408 A1 Mar. 8, 2012

(30) Foreign Application Priority Data

Sep. 8, 2010 (CN) ...................... 2010 2 0525455 U

(51) Int. Cl.
*B62B 7/08* (2006.01)
(52) U.S. Cl.
CPC ........................................ *B62B 7/08* (2013.01)
USPC .......... 280/642; 280/647; 280/650; 280/47.38
(58) Field of Classification Search
CPC ......................................................... B62B 7/08
USPC ....................... 280/642, 647, 649, 650, 47.38
See application file for complete search history.

(56) References Cited

U.S. PATENT DOCUMENTS

| | | | | |
|---|---|---|---|---|
| 4,506,907 A * | 3/1985 | Miyagi | ........................ | 280/642 |
| 4,844,504 A * | 7/1989 | Bigo | ........................... | 280/642 |
| 5,417,450 A * | 5/1995 | Wang | .......................... | 280/642 |
| 5,421,603 A * | 6/1995 | Wills et al. | ..................... | 280/642 |
| 5,553,885 A * | 9/1996 | Chang | ........................... | 280/642 |
| 5,718,444 A * | 2/1998 | Huang | ........................... | 280/650 |
| 5,938,230 A * | 8/1999 | Huang et al. | .................... | 280/650 |
| 6,113,128 A * | 9/2000 | Watkins | ........................ | 280/647 |
| 6,241,273 B1 * | 6/2001 | Gehr | ............................ | 280/642 |
| 6,270,111 B1 * | 8/2001 | Hanson et al. | ................ | 280/650 |
| 6,626,451 B1 * | 9/2003 | Song | ............................. | 280/642 |
| 6,746,075 B2 * | 6/2004 | Cheng et al. | .................. | 297/149 |
| 7,000,938 B2 * | 2/2006 | Watkins | ........................ | 280/642 |
| 7,044,498 B2 * | 5/2006 | Chen | ............................. | 280/642 |
| 7,077,423 B2 * | 7/2006 | Hutchinson | ................... | 280/649 |
| 7,118,121 B2 * | 10/2006 | Cheng et al. | .................. | 280/642 |
| 7,281,731 B2 * | 10/2007 | Shamah | ........................ | 280/639 |

(Continued)

FOREIGN PATENT DOCUMENTS

FR 2736321 A1 * 1/1997

*Primary Examiner* — John R Olszewski
*Assistant Examiner* — Jacob Meyer
(74) *Attorney, Agent, or Firm* — Morris Manning & Martin, LLP; Tim Tingkang Xia, Esq.

(57) ABSTRACT

A foldable stroller frame with an auto-extending wheel distance adjustment is provided with at least a front support rack, a rear support rack, a pushing rack and a pair of power transmitting rods. A pair of first sliding-and-pivoting connectors is mounted for moving along the front support rack and permitting the pair of rear wheel sets capable of moving toward the front wheel set for shortening the wheel distance between the pair of rear wheel sets and the front wheel set. The pushing rack has an upper pushing section and a lower pushing section pivoted to the lower portion of the upper pushing section. The pair of power transmitting rods is connected between the rear support rack and the pushing rack for driving the rear support rack by rotating the pushing rack.

13 Claims, 6 Drawing Sheets

U.S. PATENT DOCUMENTS

| | | | |
|---|---|---|---|
| 7,422,230 B2 * | 9/2008 | Chuan | 280/642 |
| 7,641,216 B2 * | 1/2010 | Cone, II | 280/642 |
| 7,891,696 B2 * | 2/2011 | Hanson | 280/647 |
| 7,900,952 B2 * | 3/2011 | Cone, II | 280/650 |
| 8,104,788 B2 * | 1/2012 | Cone, II | 280/650 |
| 8,186,706 B2 * | 5/2012 | Dotsey | 280/647 |
| 8,246,072 B2 * | 8/2012 | Groppo | 280/642 |
| 8,276,935 B2 * | 10/2012 | Minato et al. | 280/647 |
| 2002/0121766 A1 * | 9/2002 | Suzuki | 280/647 |
| 2002/0135159 A1 * | 9/2002 | Watkins | 280/650 |
| 2004/0169353 A1 * | 9/2004 | Kinzel | 280/650 |
| 2004/0222615 A1 * | 11/2004 | Cheng et al. | 280/642 |
| 2006/0043699 A1 * | 3/2006 | Chuan | 280/647 |
| 2006/0214396 A1 * | 9/2006 | Horacek | 280/642 |
| 2006/0273553 A1 * | 12/2006 | Lan | 280/642 |
| 2007/0085302 A1 * | 4/2007 | You et al. | 280/642 |
| 2007/0222188 A1 * | 9/2007 | Dean et al. | 280/642 |
| 2009/0033065 A1 * | 2/2009 | Kassai et al. | 280/647 |
| 2009/0134604 A1 * | 5/2009 | Ohnishi | 280/649 |
| 2009/0278335 A1 * | 11/2009 | Dotsey | 280/647 |
| 2009/0315299 A1 * | 12/2009 | Barenbrug | 280/642 |
| 2010/0109291 A1 * | 5/2010 | Groppo | 280/642 |
| 2010/0133789 A1 * | 6/2010 | Tanizaki et al. | 280/642 |
| 2011/0181025 A1 * | 7/2011 | Chen | 280/647 |

* cited by examiner

FOLDABLE STROLLER FRAME WITH AN AUTO-EXTENDING WHEEL DISTANCE ADJUSTMENT

CROSS-REFERENCE TO RELATED APPLICATIONS

This non-provisional application claims priority under 35 U.S.C. §119(a) on Patent Application No. 201020525455.2 filed in China on Sep. 8, 2010, the entire contents of which are hereby incorporated by reference.

BACKGROUND OF THE INVENTION

1. Field of the Invention

The present invention relates generally to a stroller frame, especially to a stroller frame which is capable of enlarging the wheel distance between front wheel and rear wheel automatically when deploying from a folded position to a use position.

2. Description of the Related Art

Some of the foldable stroller frames, such as European Style Strollers disclosed in U.S. Pat. Nos. 2,642,296 and 5,921,574, which normally have a fixed width between the left side and right side and can only be folded in longitudinal direction. When being folded up, the wheel distance between the front wheel and rear wheel may sometime be too long to put into a small vehicle or a limited storage cabinet in user's house.

SUMMARY OF THE INVENTION

For creating a new foldable stroller frames which is capable of reducing the wheel distance between the front wheel and rear wheel when being needed to fold into a compact configuration for storage, and capable of enlarging the wheel distance automatically while being needed to deploy into a use configuration.

The foldable stroller frames according to the present invention, may comprise at least a front support rack, a rear support rack, a pushing rack and a pair of power transmitting rods. The rear support rack has an upper end, an upper section, a lower end, a pair of first sliding-and-pivoting connectors pivoted at said upper section of the rear support rack; wherein the pair of first sliding-and-pivoting connectors are movable along the front support rack that permits the pair of rear wheel sets moving toward the front wheel set for shorting the wheel distance between the pair of rear wheel sets and the front wheel set, and leaving the front wheel set for extending said wheel distance. The pushing rack has an upper pushing section and a lower pushing section pivoted to the lower portion of the upper pushing section. The pair of power transmitting rods both are connected between the rear support rack and the distal end of the upper pushing section of the pushing rack for driving the rear support rack moving toward and apart from the front support rack by rotating the upper pushing section of the pushing rack back and forth.

BRIEF DESCRIPTION OF THE DRAWINGS

The accompanying drawings, which are included to provide a further understanding of the invention are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention; examples of which are illustrated in the accompanying drawings.

Figure 1:
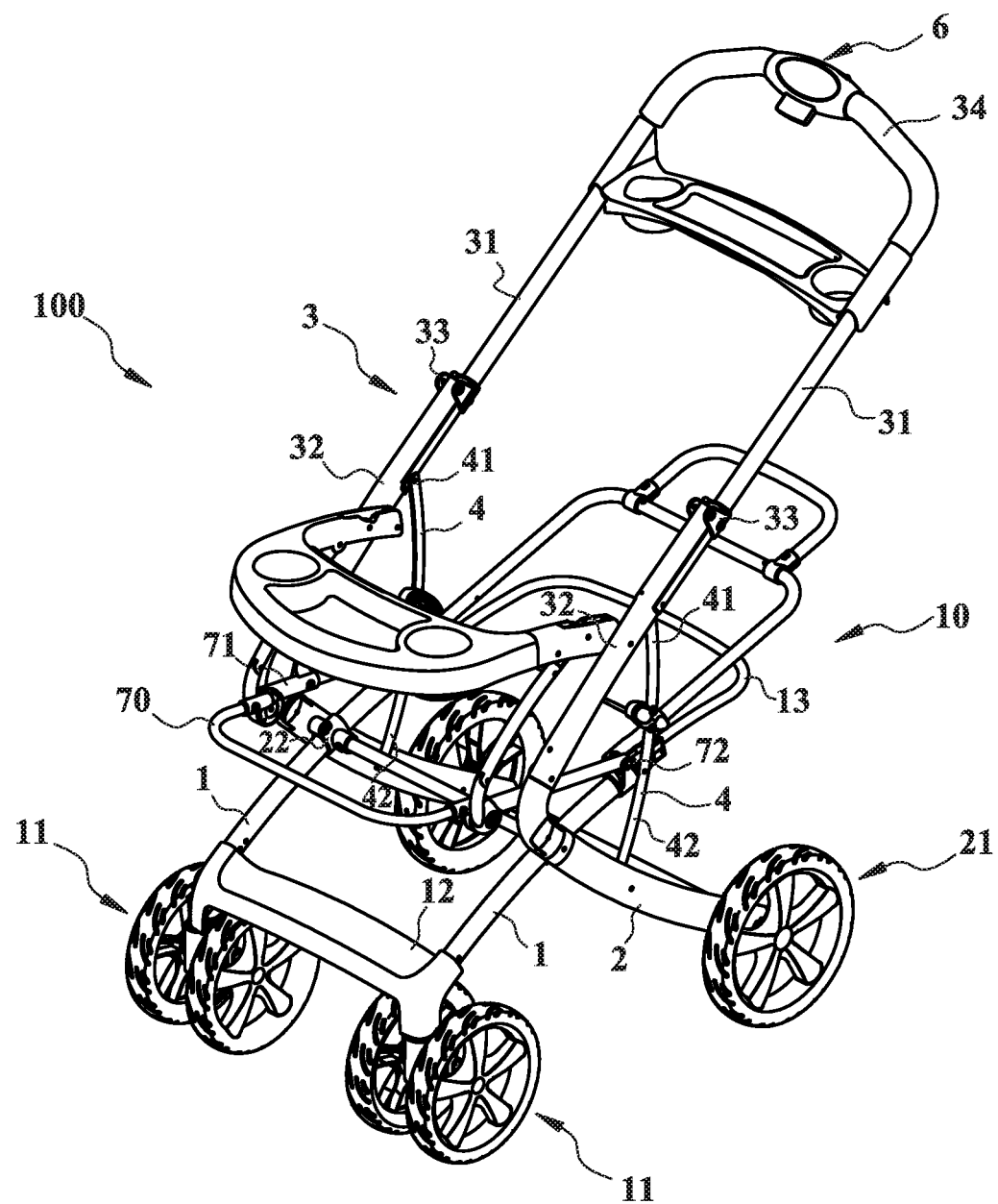
FIG. 1 is a perspective view showing a foldable stroller frame with an auto-extending wheel distance adjustment according to the present invention.
Figure 2:
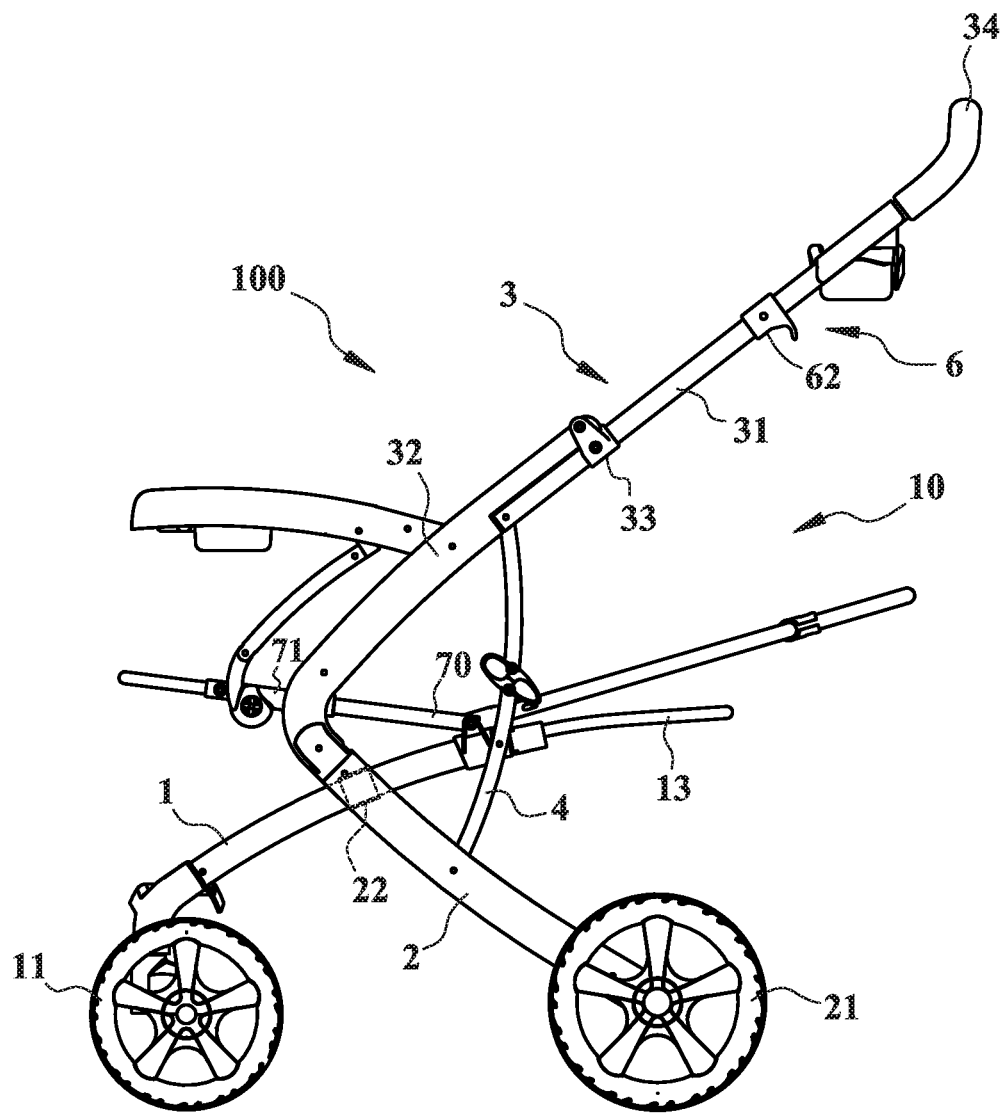
FIG. 2 is a side view showing the foldable stroller frame with an auto-extending wheel distance adjustment according to the present invention
Figure 6:
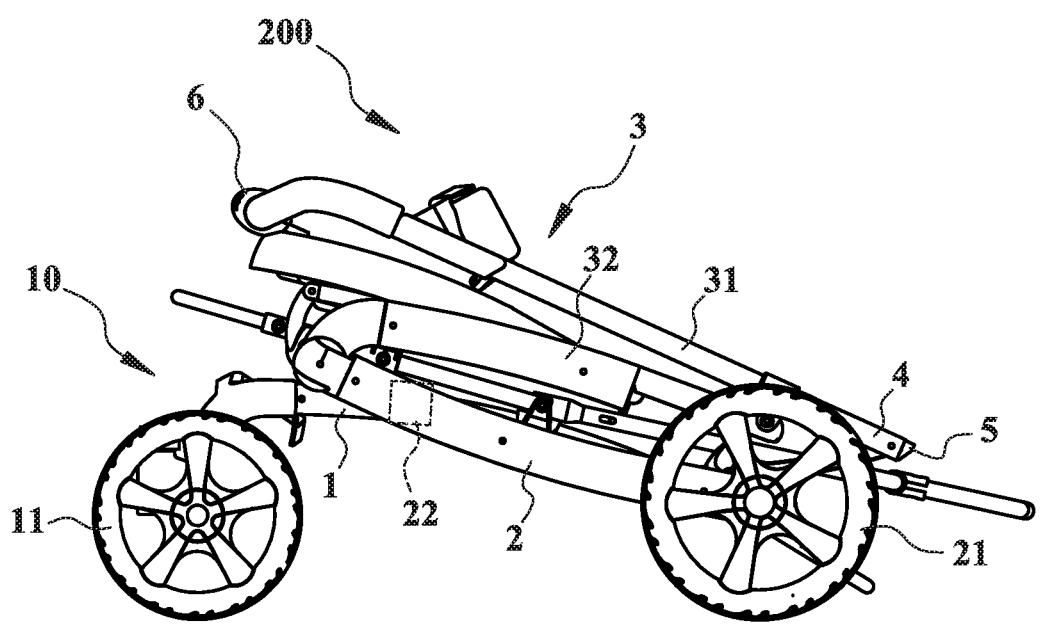
FIG. 6 is a side view showing a final stage of folding the foldable stroller frame by releasing the latching mechanism mounted at the distal end of the upper pushing section.

Referring to FIGS. 1, 2 and 6, an embodiment of the foldable stroller frame 10 with an auto-extending wheel distance adjustment, comprises at least a front support rack 1, a rear support rack 2, a pushing rack 3 and a pair of power transmitting rods 4. The foldable stroller frame 10 can be converted and fixed in an erected position 100 and a folded position 200 as shown in FIG. 6 by unlocking and rotating the upper section 31 of the pushing rack 3 forwardly.

The front support rack 1 connects with at least a front wheel set 11 at its lower end. The front support rack 1 may also be equipped with a foot rest 12 and a shopping basket holding rack 13.

Referring to FIG. 2, the rear support rack 2 evidently has an upper end, an upper section near to the upper end, a lower end, a pair of first sliding-and-pivoting connectors 22 pivoted at the upper section. A pair of rear wheel sets 21 both are connected to the lower end of rear support rack 2.

The pair of first sliding-and-pivoting connectors 22 both are movable along the front support rack 1 so as to permit the pair of rear wheel sets 21 moving toward the front wheel set 11 for shorting the wheel distance between the pair of rear wheel sets 21 and the front wheel set 11, and leaving the front wheel set 11 for extending the wheel distance.

The pushing rack 3 comprises an upper pushing section 31, a lower pushing section 32, and a pivot connector 33 mounted on the lower portion of the upper pushing section 31 for pivotally connecting the upper distal end of the lower pushing section 32 to the lower portion of the upper pushing section 31.

Figure 3:
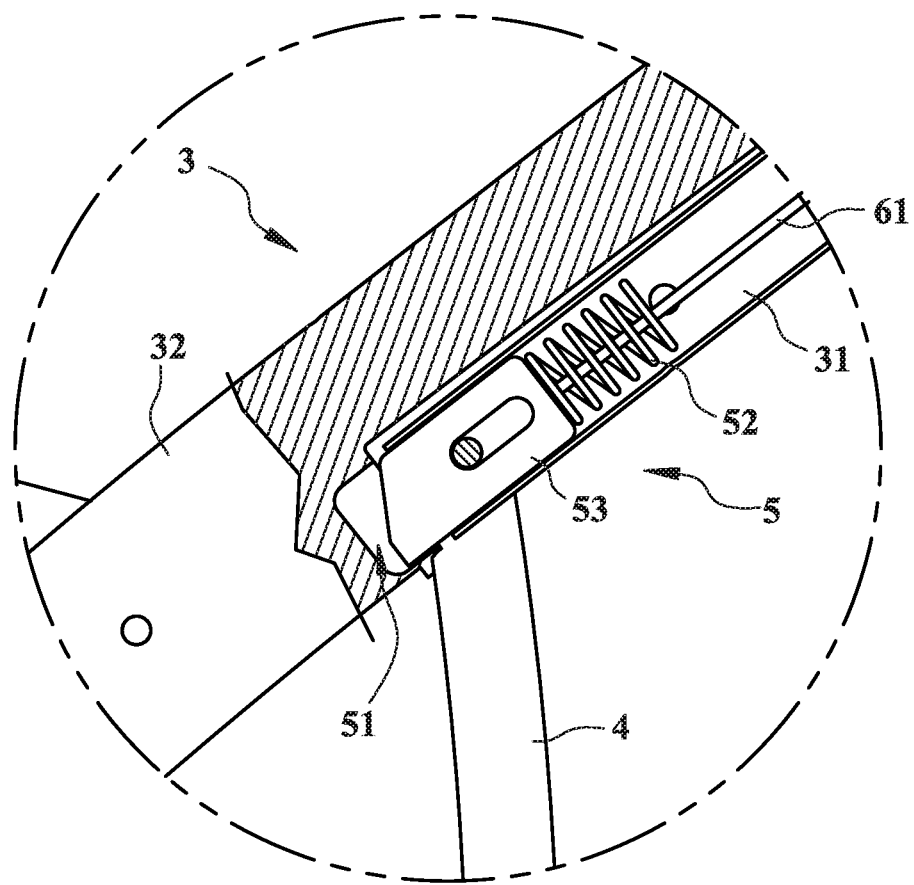
FIG. 3 is a schematic enlarged view illustrating a latching mechanism which releasably latches the upper pushing section to the lower pushing section thereby preventing the upper pushing section from rotating relative to the lower pushing section.

The upper pushing section 31 has a lower distal end capable of releasably connected to the upper portion of the lower pushing section 32. Referring to FIG. 3, the upper portion of the lower pushing section 32 may be equipped with an engaging portion 51, such as a hole, recess or indent. Further, a latching mechanism 5 may be equipped on the lower distal end of the upper pushing section 31 thereby releasably latching the upper pushing section 31 to the lower pushing section for preventing the upper pushing section 31 from rotation relative to the lower pushing section 32.

The latching mechanism 5 may include a spring-loaded latching slider 53 for latching into the engaging portion 51 of the upper portion of the lower pushing section 32. Referring again to FIG. 3, the spring-loaded latching slider 53 is biased by a resilient 52 toward to engaging portion 51.

Figure 4:
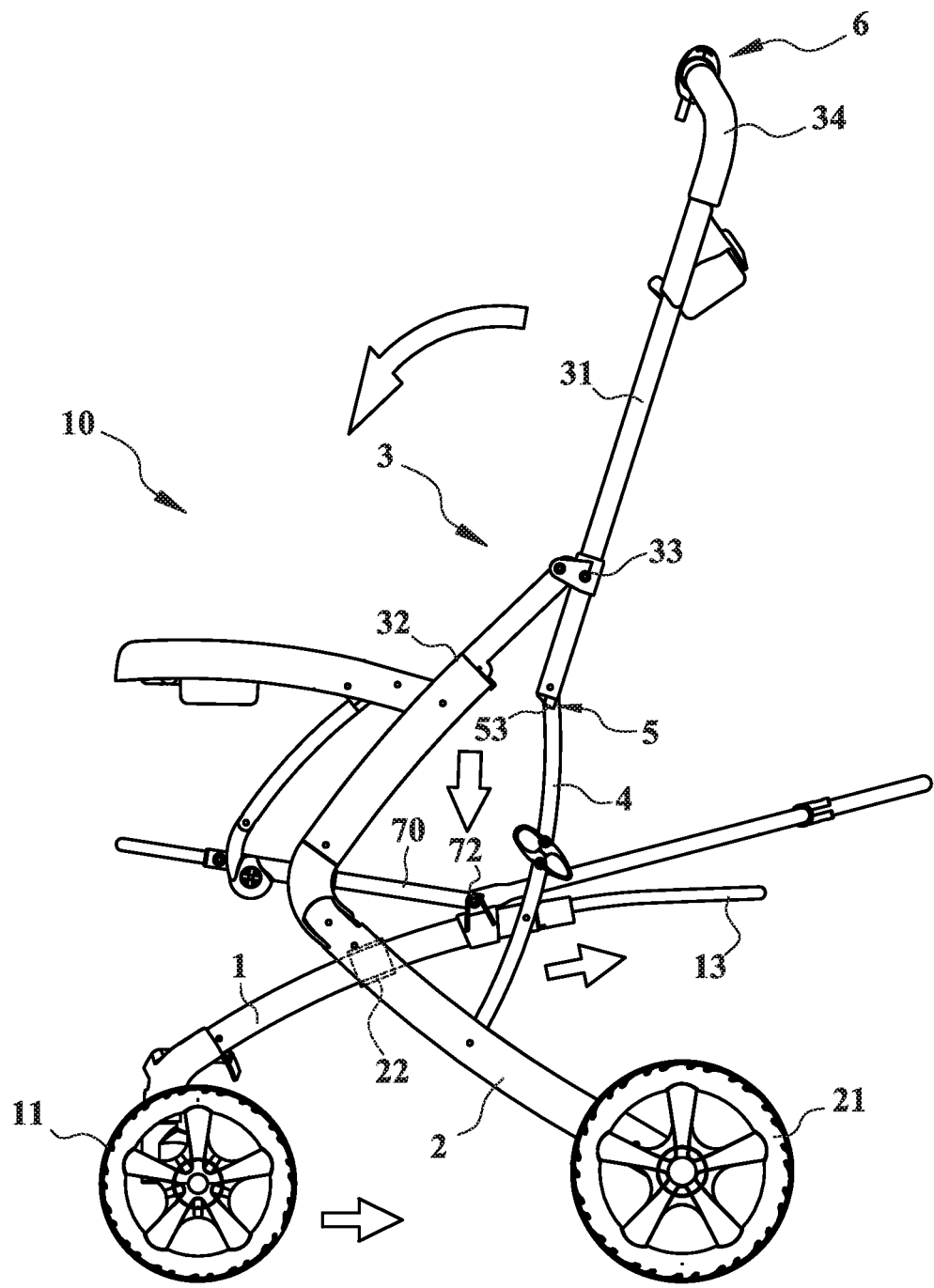
FIG. 4 is a side view showing an initial stage for folding the foldable stroller frame by releasing the latching mechanism mounted at the distal end of the upper pushing section.

The spring-loaded latching slider 53 may be associated with a release mechanism 6 for disengaging the spring-loaded latching slider 53 from the engaging portion 51, so as to start an initial stage for folding the foldable stroller frame 10 by releasing the latching mechanism 5 as shown in FIG. 4.

The release mechanism 6 may be associated with the spring-loaded latching slider 53 through a wire 61, so as to move the spring-loaded latching slider 53 against the biasing of the resilient 52 remotely, when being entering the initial stage of folding the foldable stroller frame 10.

As shown in FIG. 2, the release mechanism 6 may be embodied as a hook-shaped sliding driver 62. The hook-shaped sliding driver 62 is connected with the spring-loaded latching slider 53 via the wire 61. Preferably, the hook-shaped sliding driver 62 is movably and operatively installed on the upper pushing section 31 for driving the spring-loaded latching slider 53, or the hook-shaped sliding driver 62 can be sleeved on the upper pushing section 31.

As shown in FIGS. 1, 4 to 6, the release mechanism 6 may otherwise be embodied to include an one-hand-controllable apparatus (referring to that sort of one-hand-controllable apparatus disclosed in U.S. Pat. No. 6,443,479) so as to drive the two spring-loaded latching sliders 53 disposed on both sides of the pushing rack 3 synchronously.

The one-hand-controllable apparatus of the release mechanism 6 is preferably be operatively installed on the upper end of the pushing rack 3 and associated with the spring-loaded latching sliders 53 via two wires 61. The upper end of the pushing rack 3 may be equipped with a grip-and hold portion 34 beside the release mechanism 6.

Referring to FIGS. 1 and 2, the foldable stroller frame 10 may further to include a seat support rack 70 for supporting an occupant sitting thereon. For instance, the foldable stroller frame 10 may include a second sliding-and-pivoting connector 72 movable along the front support rack 1, and the seat support rack 70 has a front end 71 pivoted to the foldable stroller frame 10 and a rear end pivoted to the second sliding-and-pivoting connector 72 thereby permitting the seat support rack 70 to follow the foldable stroller frame 10 in folding and erecting operation.

The pair of power transmitting rods 4 is capable of driving the rear support rack 2 to moving relative to the front support rack 1 by rotating the upper pushing section 31 of the pushing rack 3. Each of the pair of power transmitting rods 4 has a lower end 42 pivotally connected to the rear support rack 2, and an upper end 41 pivotally connected to a distal end of the upper pushing section 31 of the pushing rack 3.

Figure 5:
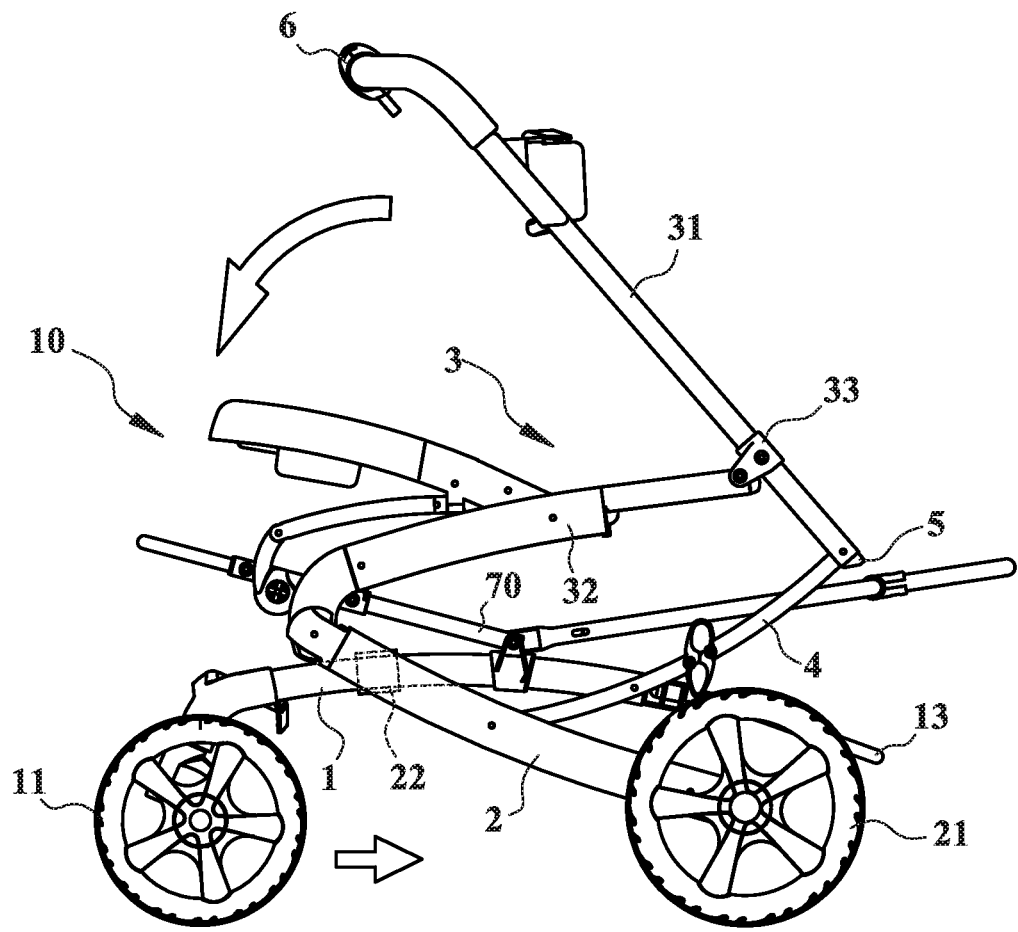
FIG. 5 is a side view showing a second stage for folding the foldable stroller frame by rotating the upper pushing section forward to close to the lower pushing section.

Referring FIG. 5, in second stage for folding the foldable stroller frame 10, when rotating the upper pushing section forward to close to the lower pushing section, the lower end 42 of the power transmitting rods 4 shall push the rear support rack 2 moving toward and closer to the front wheel 11, so as to shorten the wheel distance in the folded position 200 as shown in FIG. 6.

While particular embodiments of the invention have been described, those skilled in the art will recognize that many modifications are possible that will achieve the same goals by substantially the same system, device or method, and where those systems, devices or methods still fall within the true spirit and scope of the invention disclosed.

What is claimed is:

1. A foldable stroller frame with an auto-extending wheel distance adjustment, comprising:
   a front support rack connected with at least a front wheel set at a lower end of the front support rack;
   a rear support rack having an upper end, an upper section near to the upper end, a lower end, a pair of first sliding-and-pivoting connectors pivoted at the upper section, and a pair of rear wheel sets connected to said lower end of the rear support rack; wherein the pair of first sliding-and-pivoting connectors are movable along the front support rack to permit the pair of rear wheel sets moving toward the front wheel set for shorting a distance between the pair of rear wheel sets and the front wheel set, and leaving the front wheel set for extending said distance;
   a pushing rack, having an upper pushing section, a lower pushing section, and a pivot connector mounted on a lower portion of the upper pushing section for pivotally connecting an upper distal end of the lower pushing section to the lower portion of the upper pushing section;
   a pair of power transmitting rods, for driving the rear support rack moving relatively to the front support rack by rotating the upper pushing section of the pushing rack, each of the pair of power transmitting rods having a lower end pivotally connected to the rear support rack, and an upper end pivotally connected to a distal end of the lower portion of the upper pushing rack.

2. The foldable stroller frame of claim 1, wherein the lower pushing section has an upper portion formed with an engaging portion, and the lower distal end of the upper pushing section of the pushing rack is releasably engageable to the engaging portion.

3. The foldable stroller frame of claim 2 further includes a latching mechanism for releasably engaging to the engaging portion of the upper portion of the lower pushing section.

4. The foldable stroller frame of claim 3, wherein the latching mechanism includes a spring-loaded latching slider for latching into the engaging portion of the upper portion of the lower pushing section.

5. The foldable stroller frame of claim 3 further includes a release mechanism for disengaging the latching mechanism from the engaging portion of the upper portion of the lower pushing section.

6. The foldable stroller frame of claim 4 further includes a release mechanism for driving the spring-loaded latching slider to disengage from the engaging portion of the upper portion of the lower pushing section.

7. The foldable stroller frame of claim 6, wherein the release mechanism includes a hook-shaped sliding driver connected with the spring-loaded latching slider via a wire.

8. The foldable stroller frame of claim 7, wherein the hook-shaped sliding driver is movably and operatively installed on the upper pushing section for driving the spring-loaded latching slider.

9. The foldable stroller frame of claim 8, wherein the hook-shaped sliding driver is sleeved on the upper pushing section.

10. The foldable stroller frame of claim 6, wherein the release mechanism includes a one-hand-controllable apparatus for driving two spring-loaded latching sliders disposed on both sides of the pushing rack synchronously.

11. The foldable stroller frame of claim 6, wherein the release mechanism is operatively installed on an upper end of the pushing rack and associated with the spring-loaded latching slider via two wires.

12. The foldable stroller frame of claim 1, further includes a seat support rack for supporting an occupant sitting thereon.

13. The foldable stroller frame of claim 1, further includes a second sliding-and-pivoting connector and a seat support rack; wherein the second sliding-and-pivoting connector is movable along the front support rack, and the seat support rack has a front end pivoted to the foldable stroller frame and a rear end pivoted to the second sliding-and-pivoting connector thereby permitting the seat support rack to follow the foldable stroller frame in folding and erecting operation.

* * * * *